United States Patent
Schmidt et al.

(10) Patent No.: US 9,133,962 B2
(45) Date of Patent: Sep. 15, 2015

(54) EXHAUST GAS SYSTEM COMPONENT FOR INTERNAL COMBUSTION ENGINE AND METHOD OF MANUFACTURING AN EXHAUST GAS SYSTEM COMPONENT

(71) Applicant: FRIEDRICH BOYSEN GMBH & CO. KG, Altensteig (DE)

(72) Inventors: Jurgen Schmidt, Muhlacker (DE); Reiner Mertens, Bruckerberg (DE); Michael Schleh, Pfalzgrafenweiler (DE); Thorsten Mohr, Herrenberg (DE); Frank Buhler, Motzingen (DE)

(73) Assignee: Friedrich Boysen GmbH & Co. KG (DE)

( * ) Notice: Subject to any disclaimer, the term of this patent is extended or adjusted under 35 U.S.C. 154(b) by 0 days.

(21) Appl. No.: 14/046,116

(22) Filed: Oct. 4, 2013

(65) Prior Publication Data

US 2014/0096856 A1    Apr. 10, 2014

(30) Foreign Application Priority Data

Oct. 4, 2012   (DE) .......................... 10 2012 218 136

(51) Int. Cl.
| | |
|---|---|
| *F01N 3/24* | (2006.01) |
| *F16L 3/00* | (2006.01) |
| *F01N 13/00* | (2010.01) |
| *F01N 13/02* | (2010.01) |
| *F01N 13/14* | (2010.01) |
| *F01N 13/18* | (2010.01) |

(52) U.S. Cl.
CPC ............... *F16L 3/00* (2013.01); *F01N 13/0097* (2014.06); *F01N 13/02* (2013.01); *F01N 13/1805* (2013.01); *F01N 13/1872* (2013.01); *F01N 13/141* (2013.01); *F01N 13/1838* (2013.01); *F01N 2470/22* (2013.01); *Y10T 29/49398* (2015.01)

(58) Field of Classification Search
CPC    F01N 13/0097; F01N 13/141; F01N 13/1838
USPC .......... 60/274, 296, 297, 299, 311; 29/890.08
See application file for complete search history.

(56) References Cited

U.S. PATENT DOCUMENTS

| | | | |
|---|---|---|---|
| 3,115,209 A | 12/1963 | Bembinster | |
| 4,410,013 A * | 10/1983 | Sasaki et al. .................. | 138/149 |

(Continued)

FOREIGN PATENT DOCUMENTS

| | | |
|---|---|---|
| DE | 3037165 C2 | 4/1981 |
| JP | S60-122217 A | 6/1985 |

(Continued)

OTHER PUBLICATIONS

German International Search Report dated May 2, 2013.

*Primary Examiner* — Thomas Denion
*Assistant Examiner* — Jorge Leon, Jr.
(74) *Attorney, Agent, or Firm* — Amster, Rothstein & Ebenstein LLP

(57) ABSTRACT

The invention relates to an exhaust gas system component for an internal combustion engine, in particular for an automotive engine of a commercial vehicle, having a plurality of mutually connected exhaust gas system elements which can be flowed through by the exhaust gas of the internal combustion engine, characterized in that the exhaust gas system elements are supported in a first frame and in a second frame spaced apart therefrom and connection struts fixedly connect the frames to one another.

20 Claims, 3 Drawing Sheets

(56) References Cited

U.S. PATENT DOCUMENTS

Figure 1A:
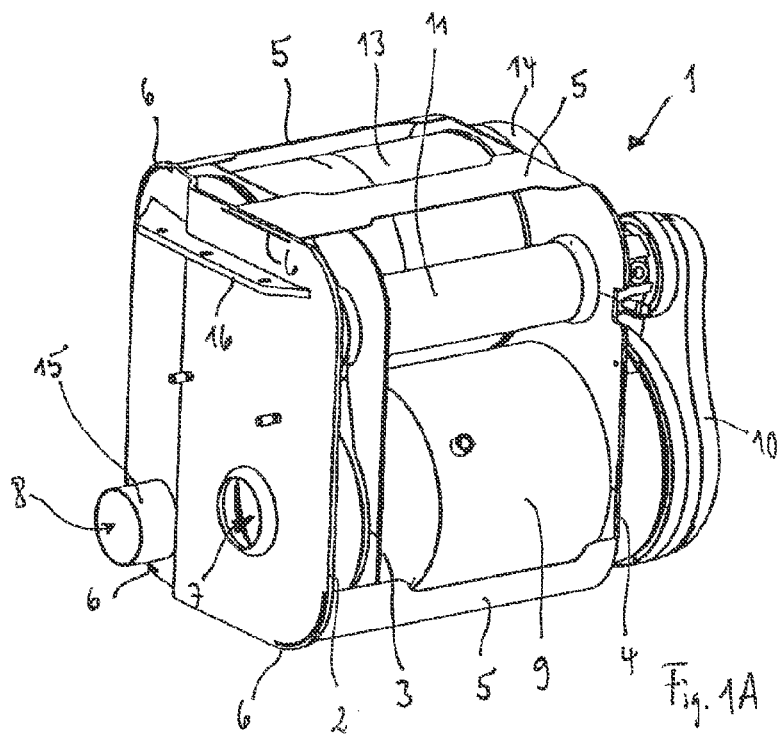

| | | | |
|---|---|---|---|
| 5,024,289 A * | 6/1991 | Merry | 181/231 |
| 6,659,222 B1 * | 12/2003 | Allman | 181/282 |
| 2002/0023346 A1 * | 2/2002 | Butler | 29/890.08 |
| 2003/0000208 A1 * | 1/2003 | Knight et al. | 60/299 |
| 2006/0156712 A1 * | 7/2006 | Buhmann et al. | 60/297 |
| 2008/0060870 A1 * | 3/2008 | Rauch et al. | 181/272 |
| 2009/0293467 A1 * | 12/2009 | Boeckenhoff | 60/324 |
| 2010/0050618 A1 * | 3/2010 | Huthwohl et al. | 60/299 |
| 2010/0061898 A1 * | 3/2010 | Lehnen et al. | 422/168 |
| 2010/0186394 A1 * | 7/2010 | Harrison et al. | 60/299 |
| 2011/0041485 A1 * | 2/2011 | Kimura | 60/297 |
| 2011/0232243 A1 * | 9/2011 | De Rovere et al. | 55/495 |
| 2012/0102928 A1 * | 5/2012 | Hehle et al. | 60/295 |
| 2012/0102931 A1 * | 5/2012 | Kotrba et al. | 60/303 |
| 2012/0222413 A1 * | 9/2012 | Golin et al. | 60/311 |
| 2012/0279206 A1 * | 11/2012 | Geyer et al. | 60/287 |
| 2013/0125524 A1 * | 5/2013 | Plummer et al. | 60/39.5 |
| 2013/0209319 A1 * | 8/2013 | Schaffner et al. | 422/169 |

FOREIGN PATENT DOCUMENTS

| | | |
|---|---|---|
| JP | 2002256844 A | 9/2002 |
| JP | 2010007526 A | 1/2010 |

* cited by examiner

EXHAUST GAS SYSTEM COMPONENT FOR INTERNAL COMBUSTION ENGINE AND METHOD OF MANUFACTURING AN EXHAUST GAS SYSTEM COMPONENT

The present invention relates to an exhaust gas system component for an internal combustion engine, in particular for an automotive engine of a commercial vehicle, comprising a plurality of mutually connected exhaust gas system elements which can be flowed through by the exhaust gas of the internal combustion engine.

The present invention furthermore relates to a method of manufacturing such an exhaust gas system component.

Exhaust gas system components, in particular when they are designed for commercial vehicles, can comprise a plurality of mutually connected exhaust gas system elements and can have high weights. Due to the accelerations which such an exhaust gas system component fastened to the vehicle undergoes during travel, the exhaust gas system elements can be rotated on themselves or also toward one another in an unwanted manner.

It is therefore the underlying object of the invention to provide an exhaust gas system component improved in this respect. A corresponding manufacturing method should furthermore be set forth.

This object is satisfied with an exhaust gas system component of the initially named kind in that the exhaust gas system elements are supported in a first frame and in a second frame spaced apart therefrom and connection struts connect the frames fixedly to one another.

The frames fixedly connected to one another via the connection struts effect a stiffening of the structure of the exhaust gas system component, whereby the risk of rotation of the mutually connected exhaust gas system elements is reduced without the weight of the component being increased too much.

The connection struts preferably each form a support surface onto which a jacket forming a peripheral wall is placed. The jacket serves as protection for the exhaust gas system elements and additionally effects a further stiffening of the exhaust gas system component.

In accordance with an embodiment, the jacket comprises an inner jacket and an outer jacket. The inner jacket lies on the support surfaces of the connection struts and is surrounded by the outer jacket.

This measure makes it possible to provide an insulation space between the inner jacket and the outer jacket, said insulation space being filled at least regionally with heat insulation material, in particular a needle mat. A good heat screening of the exhaust gas system elements flowed through by the hot exhaust gas in operation can be achieved by the heat insulation material.

It is particularly advantageous if a material is used as the heat insulation material which is simultaneously suitable for acoustic absorption. Such materials are known and increase the muffling properties of the exhaust gas system component.

Holes, in particular elongate holes, can be provided at least regionally in the wall of the inner jacket for fastening the inner jacket to the connection struts. The inner jacket is advantageously welded to the connection struts in the region of the holes.

Mufflers, catalytic converters, particle filters, deflection shells and/or exhaust pipes can be provided as exhaust gas system elements, for example. A respective one or more elements of these exhaust gas system elements can be integrated into the exhaust gas system component.

To be able to assemble the frames and the connection struts simply and with as little welding deformation as possible, one of the frames preferably has slits, in particular disposed in its peripheral region, into which the connection struts are slotted. The connection struts can be welded to the frame. The connection struts can furthermore be placed onto the margin of the other frame and can likewise be welded to it.

In accordance with a further embodiment, one or both frames have cut-outs into which exhaust pipes are inserted which form an exhaust gas inlet opening or an exhaust gas outlet opening of the exhaust gas system component.

A fastening apparatus for fastening the exhaust gas system component to a motor vehicle can be arranged at one or both frames. The fastening apparatus can in particular be inserted into a cut-out of the respective frame. The fastening apparatus is preferably welded to the frame at one side thereof. The side of the frame remote from the weld seam is preferably used as an assembly surface which is fastened to a corresponding surface of the motor vehicle. The assembly surface is kept free from disturbing weld seams and weld splashes by the welding of the fastening apparatus on the side of the frame disposed opposite the assembly surface so that the maximum assembly surface is available for attachment to the motor vehicle. In addition, due to the displacement of the weld seams away from the assembly surface, the unwanted deformation of the assembly surface caused by the welding is reduced.

The exhaust gas system elements are preferably supported in a third frame which can be arranged between the first and second frames for the further stabilization of the exhaust gas system component. The connection struts are in particular placed onto the margin of the third frame and are welded thereto. It is furthermore also conceivable to provide further such frames which are fixedly connected to the connection struts.

Figure 1B:
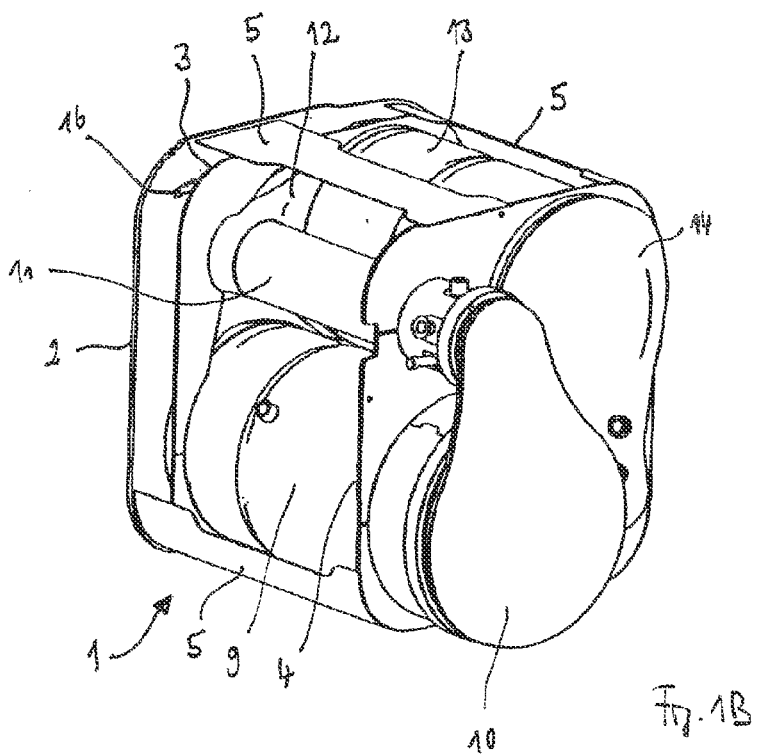
Figure 2A:
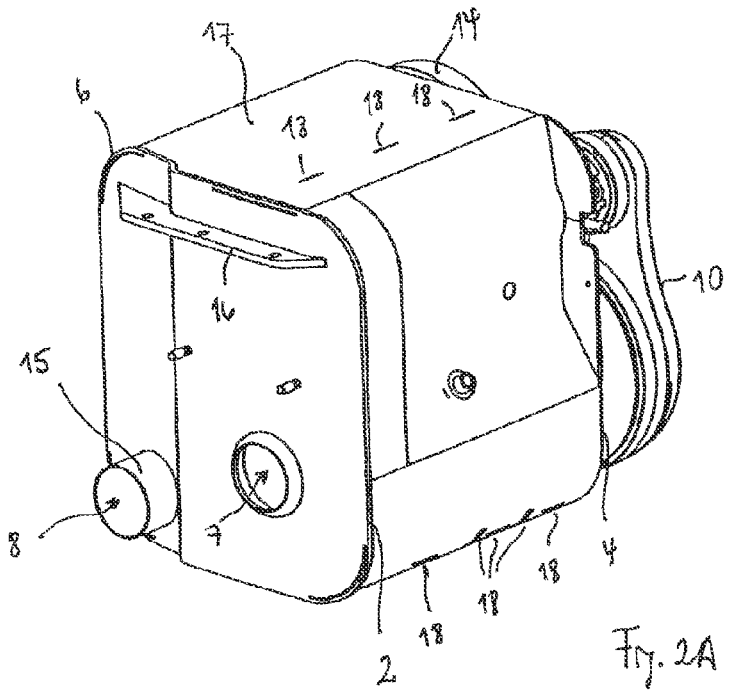
Figure 2B:
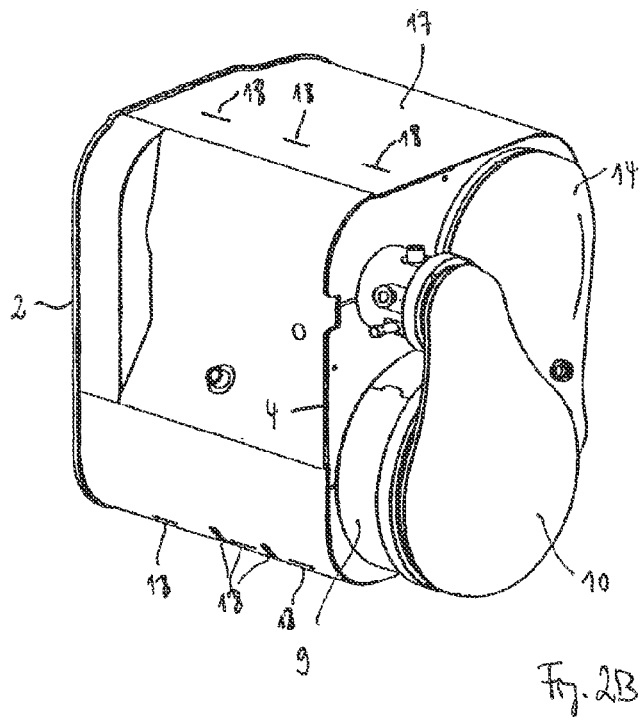
Figure 3A:
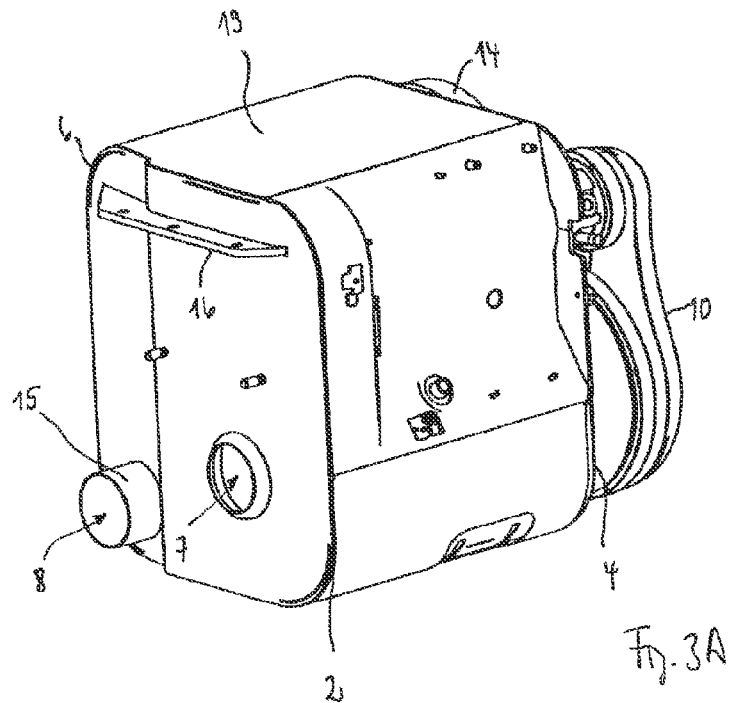
Figure 3B:
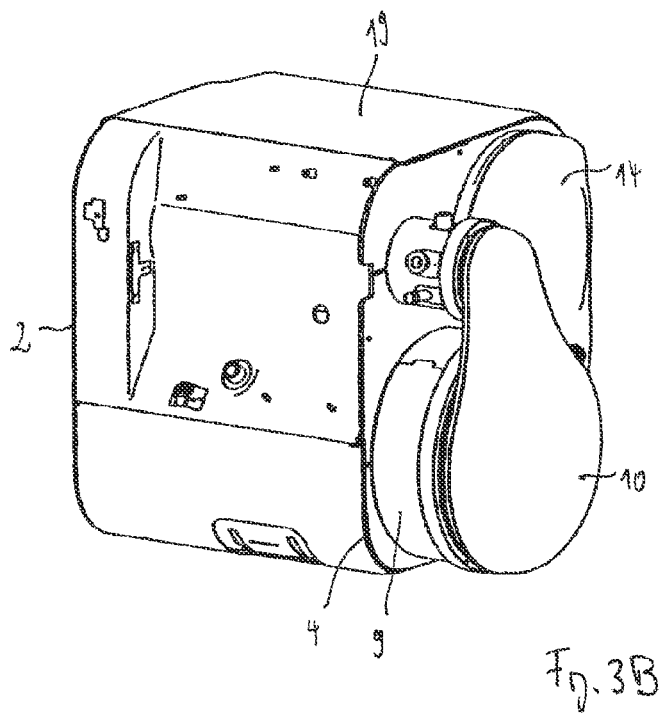

Embodiments of the invention are shown in the drawings and will be described in the following. There are shown schematically FIGS. 1A and 1B perspective views of an exhaust gas system component in accordance with the invention with exhaust gas system elements supported in frames;

FIGS. 2A and 2B perspective views of the exhaust gas system component of FIGS. 1A and 1B with an inner jacket welded to the frame; and FIGS. 3A and 3B perspective views of the exhaust gas system component of FIGS. 2A and 2B with an outer jacket welded to the frame and to the inner jacket.

FIGS. 1A and 1B show a part of an exhaust gas system component from two different directions of view. The exhaust gas system component can in particular be designed for a commercial vehicle and can be integrated into an exhaust train, not shown. The exhaust gas system component has a plurality of mutually connected exhaust gas system elements 1 which are known per se and through which exhaust gas generated by an internal combustion engine flows during operation. The individual exhaust gas system elements 1 will be described by way of example further below and can, for example, be mufflers, catalytic converters, particle filters, deflection shells and/or exhaust pipes.

The exhaust gas system elements 1 are supported in three frames 2, 3, 4 in the present embodiment. The frames 2-4 have cut-outs which are adapted to the shape of the exhaust gas system elements 1 and into which the exhaust gas system elements 1 are inserted. The frames 2-4 are fixedly connected to the exhaust gas system elements 1 and are welded for this purpose to the exhaust gas system elements 1 at specific points.

The frames 2-4 are produced from metal sheets which are planar at least regionally and are positioned spaced apart from one another and substantially in parallel with one another. The material and the wall thickness of the frames 2-4 are selected such that the frames 2-4 fixedly connected to the exhaust gas system elements 1 provide a sufficient stability of the exhaust gas system component.

Connection struts 5 connect the frames 2-4 fixedly to one another. In the present embodiment, four connection struts 5 are provided which are arranged substantially transversely to the frames 2-4 and are formed in the manner of a flat band. The frame 2 has slits 6 adapted to the cross-section of the connection struts 5 in its peripheral region. The connection struts 5 are slotted into the slits 6 and are welded to the frame 2 at the outer side, i.e. the side of the frame 2 remote from the other frames 3, 4. The connection struts 5 furthermore lie on the margins of the two other frames 3, 4 and are likewise welded thereto. The connection struts 5 are dimensioned such that they extend substantially from the frame 2 up to the frame 4.

The frames 2-4 form, together with the connection struts 5, a stiff structure which is in particular unsupported, to which the exhaust gas system elements 1 are fastened and which stabilizes the total structure of the exhaust gas system component.

The exhaust gas system elements 1 can be different elements which can be flowed through by the exhaust gas and which can be configured, arranged and mutually connected in a manner adapted to the respective requirement. The exhaust gas system elements 1 shown in FIGS. 1A and 1B and described in the following are therefore only to be understood as an embodiment.

The exhaust gas system component shown in FIGS. 1A and 1B has an exhaust gas inlet opening 7 and an exhaust gas outlet opening 8 which are formed by exhaust pipes led through cut-outs in the frame 2. The exhaust gas entering through the exhaust gas inlet opening 7 first flows through a muffler 9, is then deflected by a deflection shell 10 and is guided through an exhaust pipe 11 to the other side of the exhaust gas system component. The exhaust gas flow is subsequently deflected again by means of a deflection shell 12 and is conducted into a muffler 13. A deflection shell 14 which feeds the exhaust gas flow into an exhaust pipe 15 which conducts the exhaust gas flow to the exhaust gas outlet opening 8 is arranged downstream of the muffler 13. Exhaust pipes which lead in and exhaust pipes which lead out can be connected to the exhaust gas inlet opening and to the exhaust gas outlet opening 7, 8.

A fastening apparatus 16 is inserted into a cut-out of the frame 2 and is welded to the frame 2 on the inner side, i.e. the side of the frame 2 facing the frame 3. The fastening apparatus 16 serves for fastening the exhaust gas system component to a motor vehicle and can e.g. be designed as a holder aligned transversely to the frame 2 and having holes to receive corresponding fastening materials. The side of the frame 2 remote from the frame 3 furthermore forms an assembly surface which can be mounted on a corresponding surface of the motor vehicle.

FIGS. 2A and 2B show the exhaust gas system component of FIGS. 1A and 1B with an additional inner jacket 17 which lies on support surfaces formed by the connection struts 5. The inner jacket 17 can be designed in multiple parts, with the individual parts of the inner jacket 17 being welded to one another. The wall of the inner jacket 17 furthermore has elongate holes 18 in the region of the connection struts 5. The inner jacket 17 is welded to the connection struts 5 there. The margins of the inner jacket 17 abut the sides of the frames 2, 4 respectively remote from the inner jacket 17 and are likewise welded there.

FIGS. 3A and 3B show the exhaust gas system component of FIGS. 2A and 2 with an outer jacket 19 arranged outside the inner jacket 17. An insulation space is formed at least regionally between the inner jacket 17 and the outer jacket 19 for heat insulation and can be completely filled with heat-insulating, and in particular acoustically absorbing, glass mats or ceramic fiber mats, e.g. needle mats. The elastic glass mats or ceramic fiber mats are compressed by at least a third of their volumes in the insulation space with respect to their force-free, non-assembled state, for example, so that they easily fill the volume of the insulation space.

The outer jacket 19 can be designed in multiple parts, with the individual parts of the outer jacket 19 being welded to one another. The outer jacket 19 can lie directly on the inner jacket 17 in specific regions, e.g. in the region of the connection struts 5, and can be welded to the inner jacket 17 there. The margins of the outer jacket 19 abut the sides of the frames 2, 4 facing them and are welded to the sides of the frame 2 facing them.

REFERENCE NUMERAL LIST 1 exhaust gas system elements
2 frame
3 frame
4 frame
5' connection strut
6 slit
7 exhaust gas inlet opening
8 exhaust gas outlet opening
9 muffler
10 deflection shell
11 exhaust pipe
12 deflection shell
13 muffler
14 deflection shell
15 exhaust pipe
16 fastening apparatus
17 inner jacket
18 elongate hole
19 outer jacket

The invention claimed is:

1. An exhaust gas system component for an internal combustion engine, the exhaust gas system component comprising:
a plurality of mutually connected exhaust gas system elements through which flow exhaust gas of the internal combustion engine, wherein the exhaust gas system elements are supported in a first frame and in a second frame spaced apart therefrom and connection struts fixedly connect the first and second frames to one another, wherein the exhaust gas system elements are additionally supported in a third frame which is arranged between the first and the second frames, each of the first, second and third frames has a cut-out into which the exhaust gas system elements are inserted so that the exhaust gas flows through the first, second and third frames in a direction substantially perpendicular to the first, second and third frames, respectively, each of the connection struts are formed in a flat band shape and one of the first and second frames is an outermost frame that comprises slits through which the connection struts are slotted and welded to the outermost frame, and the connection struts lie on and are welded to margins of the other frames.

2. The exhaust gas system component in accordance with claim 1, wherein the connection struts each form a support surface onto which a jacket forming a peripheral wall is placed.

3. The exhaust gas system component in accordance with claim 2, wherein the jacket comprises an inner jacket lying on the connection struts and an outer jacket surrounding the inner jacket.

4. The exhaust gas system component in accordance with claim 3, further comprising an insulation space which is at least regionally filled with heat insulation material and which is arranged between the inner jacket and the outer jacket.

5. The exhaust gas system component in accordance with claim 4, wherein the insulation material comprises a needle mat.

6. The exhaust gas system component in accordance with claim 4, wherein a material is provided as the heat insulation material which is simultaneously suitable for acoustic absorption.

7. The exhaust gas system component in accordance with claim 3, wherein the inner jacket has holes at least regionally in its wall and the inner jacket is welded to the connection struts in a region of the holes.

8. The exhaust gas system component in accordance with claim 3, wherein the inner jacket has elongate holes at least regionally in its wall and the inner jacket is welded to the connection struts in a region of the holes.

9. The exhaust gas system component in accordance with claim 1, wherein the exhaust gas elements comprise at least one of the following members selected from the group comprising one or more mufflers, one or more catalytic converters, one or more particle filters, one or more deflection shells and one or more exhaust pipes.

10. The exhaust gas system component in accordance with claim 1, wherein the slits are arranged at a peripheral region of the outermost frame.

11. The exhaust gas system component in accordance with claim 1, wherein the exhaust gas elements comprise exhaust pipes forming an exhaust gas inlet opening and an exhaust gas outlet opening, and the exhaust pipes are inserted into the cut-outs of the first and second frames.

12. The exhaust gas system component in accordance with claim 1, further comprising a fastening apparatus which is arranged at one or both of the first and second frames for fastening the exhaust gas system component to a motor vehicle.

13. The exhaust gas system component in accordance with claim 1, wherein the first, second and third frames are metal sheets that are planar at least regionally and positioned substantially in parallel with one another.

14. The exhaust gas system component in accordance with claim 13, wherein the metal sheets of the first, second and third frames comprise the cut-outs, and the cut-outs are adapted to the shape of the exhaust gas system elements.

15. A method of manufacturing an exhaust gas system component for an internal combustion engine, wherein the exhaust gas system component comprises a plurality of mutually connected exhaust gas system elements through which flow exhaust gas of the internal combustion engine, the method comprising the steps of:
  supporting the exhaust gas system elements in a first frame, a second frame and a third frame which is arranged between the first and the second frames;
  fixedly connecting the first, second and third frames to one another by means of connection struts, each of the connection struts being formed in a flat band shape, each of the first, second and third frames having a cut-out into which the exhaust gas system elements are inserted so that the exhaust gas flows through the first, second and third frames in a direction substantially perpendicular to the first, second and third frames, respectively;
  slotting and welding the connection struts through slits formed in one of the first and second frames that forms an outermost frame; and
  welding the connection struts to the other frames so that the connection struts lie on margins of the other frames.

16. The method in accordance with claim 15, further comprising the step of placing a jacket forming a peripheral wall onto the connection struts which each form a support surface.

17. The method in accordance with claim 16, wherein the jacket comprises an inner jacket and an outer jacket.

18. The method in accordance with claim 17, comprising the step of welding the inner jacket, which has holes at least regionally in its wall, to the connection struts in a region of the holes.

19. The method in accordance with claim 18, wherein the holes comprise elongate holes.

20. The method in accordance with claim 5, wherein the slits are arranged in a peripheral region of the outermost frame.

* * * * *